United States Patent
Park et al.

(10) Patent No.: US 9,742,456 B2
(45) Date of Patent: Aug. 22, 2017

(54) METHOD OF SENSING FLIP COVER

(71) Applicant: Magnachip Semiconductor, Ltd., Cheongju-si (KR)

(72) Inventors: Seung-hwan Park, Cheongju-si (KR); Hyung-nam Jin, Sejong-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 138 days.

(21) Appl. No.: 14/195,191

(22) Filed: Mar. 3, 2014

(65) Prior Publication Data

US 2015/0057050 A1     Feb. 26, 2015

(30) Foreign Application Priority Data

Aug. 22, 2013   (KR) .................. 10-2013-0099947

(51) Int. Cl.

| | | |
|---|---|---|
| *H04M 3/00* | (2006.01) | |
| *H04M 1/00* | (2006.01) | |
| *H04B 1/3888* | (2015.01) | |
| *H04M 1/02* | (2006.01) | |

(52) U.S. Cl.
CPC ........ *H04B 1/3888* (2013.01); *H04M 1/0243* (2013.01)

(58) Field of Classification Search
CPC ... H04R 2420/07; H04W 4/026; H04W 4/043
USPC .......... 455/575.1–575.2, 90.1, 90.3
See application file for complete search history.

(56) References Cited

U.S. PATENT DOCUMENTS

| | | | | |
|---|---|---|---|---|
| 5,844,816 A | * | 12/1998 | Inananga | H04R 1/1041 381/17 |
| 6,189,368 B1 | * | 2/2001 | Ichida | G01N 33/006 422/88 |
| 6,701,166 B2 | | 3/2004 | Lim | |
| 2004/0056651 A1 | * | 3/2004 | Marietta Bersana | G01D 5/145 324/207.2 |
| 2006/0010699 A1 | * | 1/2006 | Tamura | G01C 17/28 33/355 R |
| 2007/0089311 A1 | * | 4/2007 | Amundson | G01C 17/28 33/355 R |
| 2008/0074108 A1 | * | 3/2008 | Ausserlechner | G01R 33/07 324/226 |
| 2010/0117629 A1 | * | 5/2010 | Lombardi | G01D 5/145 324/207.2 |
| 2010/0298032 A1 | * | 11/2010 | Lee | G06F 1/1616 455/566 |
| 2011/0070826 A1 | * | 3/2011 | Griffin | H04B 5/02 455/41.1 |
| 2011/0241658 A1 | * | 10/2011 | Vollmer | H02P 1/46 324/207.25 |

FOREIGN PATENT DOCUMENTS

KR    20-1999-70035804    12/1997

* cited by examiner

*Primary Examiner* — San Htun
(74) *Attorney, Agent, or Firm* — NSIP Law (57) ABSTRACT

Provided is a method and devices for sensing a flip cover including determining an angle of the flip cover. A Hall sensor may be included in a mobile terminal (or display terminal) and may include at least one Hall element for collecting a magnetic field intensity generated from a magnet of the flip cover.

18 Claims, 6 Drawing Sheets

METHOD OF SENSING FLIP COVER

CROSS-REFERENCE TO RELATED APPLICATIONS

This application claims the benefit under 35 USC 119(a) of Korean Patent Application No. 10-2013-0099947 filed on Aug. 22, 2013, in the Korean Intellectual Property Office, the entire disclosure of which is incorporated herein by reference for all purposes.

BACKGROUND

1. Field

The following description relates to a method of sensing a flip cover or sensing an angle variation of a flip cover covering a mobile terminal.

2. Description of Related Art

The Korean Utility Model Registration No. 20-0167871 relates to a device of sensing whether a flip cover of a flip-type cordless phone opens or closes and discloses an idea including a PCB (Printed Circuit Board), a magnetic sensor and a flip cover. The PCB is installed inside of a body and is accessible through a selection button. The magnetic sensor detects a magnetic power at the bottom of the PCB to control a power supply of the device. Accordingly, related art is limited in its capacity of detecting motion of a flip cover. For example, related art does not describe sensing whether a horizontal slide of a flip cover from a surface of a terminal device occurs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of sensing a flip cover includes collecting a magnetic field intensity generated from a magnet of the flip cover; and determining an angle of the flip cover.

The method may be performed using a Hall sensor which includes at least one Hall element and is included in a terminal which is configured to be covered by the flip cover; the collecting a magnetic field intensity may include collecting a magnetic field intensity using the at least one hall element; and the determining an angle of the flip cover may include determining an angle of the flip cover based on the collected magnetic field intensity.

The collecting a magnetic field intensity may further include collecting a magnetic field direction of the magnet from each of the at least one Hall element.

The angle may be calculated based on an arithmetic mean value of the magnetic field intensity being collected.

The determining an angle of the flip cover may include calculating an arithmetic mean value of the magnetic field intensity being collected; calculating an angle weight based on the arithmetic mean value; and determining an angle based on the calculated angle weight.

The angle weight may decrease from a largest magnetic field intensity in response to an angle of the flip cover increasing.

The angle may be obtained by using a logarithmic function.

A base of the logarithmic function may be calculated based on the angle weight.

The base of the logarithmic function may be calculated based on log (X)/90 and X may be a smallest angle weight.

The angle may be determined by the following:

$$Y = \log a(\text{Intensity\_}N)$$

$$a = \text{Exp}[\{\text{Ln}(\text{Intensity\_}90)\}/90],$$

where Y denotes an angle of the flip cover; Intensity_N denotes an angle weight at an N degree; a denotes a base of the logarithmic function; Exp denotes an exponential function; and Ln denotes a natural logarithmic function.

The angle may be calculated based on an arithmetic mean value of magnetic field intensities for each of first and second Hall element clusters being classified according to a distance from the magnet.

The angle may calculated based on an arithmetic mean value of magnetic field intensities for each of first, second, and third Hall element clusters being classified according to a distance from the magnet.

The method may further include determining opening and closing thresholds based on the calculated angle.

The opening and closing thresholds may be determined based on opening and closing data related with a distance from the magnet.

In another general aspect, a Hall sensor included in a terminal includes at least one Hall element; and an angle determination unit configured to determine an angle of a flip cover which is configured to cover the terminal.

The flip cover may include a magnet; the at least one Hall element may be configured to collect a magnetic field intensity which is generated from the magnet; and the angle determination unit may be configured to determine the angle of the flip cover based on the collected magnetic field intensity.

In another general aspect, a terminal configured to be covered by a flip cover includes a Hall sensor, wherein the Hall sensor includes at least one Hall element; and the Hall sensor is configured to determine the angle of the flip cover.

The flip cover may include a magnet; the at least one Hall element may be configured to collect a magnetic field intensity which is generated from the magnet; and the Hall sensor may be configured to determine the angle of the flip cover based on the collected magnetic field intensity.

The determined angle may be used to change a UI (User Interface) of the terminal.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
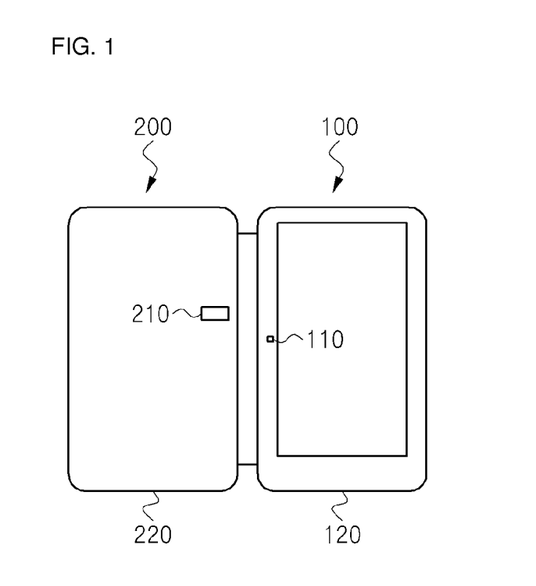
FIG. 1 is a diagram illustrating an example of a mobile terminal (or display terminal) and a flip cover.

FIG. 1 is a diagram illustrating an example of a mobile terminal (or display terminal) and a flip cover.

Referring to FIG. 1, a mobile terminal (or display terminal) 100 includes a Hall sensor 110 and a main body 120, and a flip cover 200 includes a magnet 210 and a covering unit 220. The mobile terminal (or display terminal) 100 and the flip cover 200 are only named after each function, and in other examples, the mobile terminal (or display terminal) 100 and the flip cover 200 may be integrally implemented. That is, the flip cover 200 may be directly coupled to the mobile terminal (or display terminal) 100 or to a backside battery cover of the mobile terminal (or display terminal) 100.

The mobile terminal (or display terminal) 100 may correspond to a device for wireless communication such as a cellphone, a smartphone, a two-way radio, and other communication devices. The mobile terminal (or display terminal) 100 includes the Hall sensor 110 and the main body 120.

The Hall sensor measures or senses a magnetic field intensity or a magnetic flux density being generated from the magnet 210 in the flip cover 200. For example, the Hall sensor 110 may correspond to a digital compass. The Hall sensor may be implemented as a rectangular chip and may include at least one Hall element at each corner. An example of the Hall sensor 110 will be illustrated in FIG. 2.

The main body 120 may include a display device and a wireless transceiver.

The flip cover 200 corresponds to a device capable of protecting a display and appearance of the mobile terminal (or display terminal) 100 and especially protects the mobile terminal (or display terminal) 100 from scratches or damage resulting from dropping. The flip cover 200 includes the magnet 210 for generating a magnetic field and the covering unit 220 covering a front of the mobile terminal (or display terminal) 100. An opening and closing of the flip cover 200 generates a magnetic field variation around the Hall sensor 110 and the variation is sensed by the Hall sensor 110 of the mobile terminal (or display terminal) 100.

The magnet 210 generates a magnetic field around the Hall sensor 110. The magnet 210 is attached to the covering unit 220 to move according to a movement of the covering unit 220. Accordingly, the magnetic field around the Hall sensor 110 is changed according to the degree of movement of the covering unit 220.

The covering unit 220 protects a front of the mobile terminal (or display terminal) 100 and may internally or externally include the magnet 210.

Figure 2:
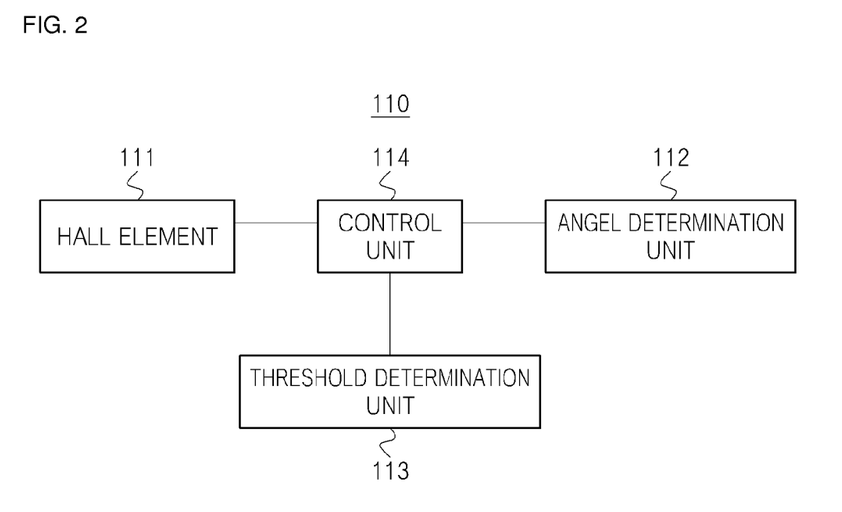
FIG. 2 is a diagram illustrating an example of the Hall sensor of FIG. 1.

FIG. 2 is a block diagram illustrating an example of the Hall sensor of FIG. 1.

Referring to FIG. 2, the Hall sensor 110 includes at least one Hall element 111, an angle determination unit 112, a threshold determination unit 113, and a control unit 114.

The at least one Hall element 111 collects information about the magnetic field intensity which is generated from the magnet 210 of the flip cover 200. The magnetic field intensity information may include information about a magnetic field direction and a magnetic field intensity. The at least one Hall element 111 uses the Hall Effect to sense the magnetic field direction and the magnetic field intensity. The Hall Effect is the production of a voltage difference (the Hall voltage) across an electrical conductor, transverse to an electric current in the conductor and a magnetic field perpendicular to the current. The Hall voltage is proportional to an amount of electric current and the magnetic field strength. Additionally, when the amount of electric current is constant, the Hall voltage is proportional to the magnetic field strength. An example of the at least one Hall element 111 will be illustrated in FIG. 3.

The angle determination unit 112 determines an angle of the flip cover 200 based on the collected magnetic field intensity. In one example, the angle determination unit 112 may determine the angle of the flip cover 200 based on the magnetic field intensity being collected by the at least one Hall element 111 or a Hall element cluster which groups a plurality of Hall elements 111. The angle information may include information about an opening angle of the flip cover 200 and may be used for the opening or closing threshold determination of the flip cover 200. Also, the angle of the flip cover 200 may be used to initiate a UI (User Interface) change of the mobile terminal (or display terminal) 100 or a mobile game. An example of the angle determination unit 112 will be illustrated in FIG. 5.

The threshold determination unit 113 determines the opening or closing threshold of the flip cover 200. For example, the opening or closing threshold of the flip cover 200 corresponds to an angle threshold which generates ON or OFF signals of the mobile terminal (or display terminal) 100. The ON or OFF signals of the mobile terminal may be generated in response to the angle of the flip cover 200 satisfying the opening or closing threshold. The opening or closing threshold of the flip cover 200 may be determined in order to minimize the sensing error affiliated with an instantaneous movement of the flip cover 200. The opening or closing threshold may be determined on each of different values through a determined angle by the angle determination unit 112. An example of the threshold determination unit 113 will be illustrated in FIG. 6.

The control unit 114 controls the operation and flow of data to the at least one Hall element 111, angle determination unit 112 and threshold determination unit 113.

Figure 3:
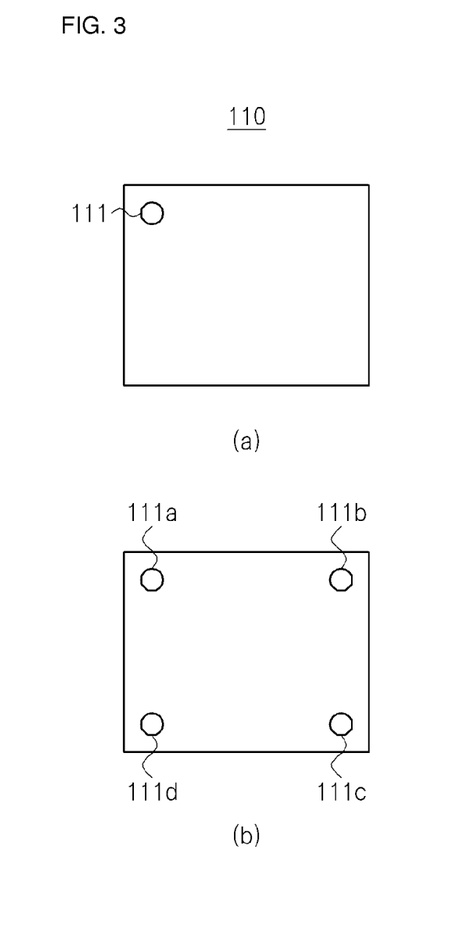
FIG. 3 is a diagram illustrating an example of at least one Hall element in a Hall sensor.

FIG. 3 is a diagram illustrating an example of the at least one Hall element in a Hall sensor.

The at least one Hall element 111 may be arranged inside the Hall sensor 110 and may collect information about the magnetic field intensity being generated from the magnet 210 of the flip cover 200. The collected magnetic field intensity information may include the magnetic field direction and the magnetic field intensity.

Referring to FIG. 3a, the Hall sensor 110 may include a single Hall element and the corresponding Hall element 111 may be arranged in one of the corners of the Hall sensor 110.

Referring to FIG. 3b, the Hall sensor may include more than one Hall element and the Hall elements 111 may be respectively arranged in each corner of the Hall sensor 110 (i.e., 111a through 111d). Each of the Hall elements 111a-111d may sense a different magnetic field intensity based on its distance from the magnet 210 of the flip cover 200. The collected magnetic field intensity may be used for angle determination of the flip cover 200.

Figure 4:
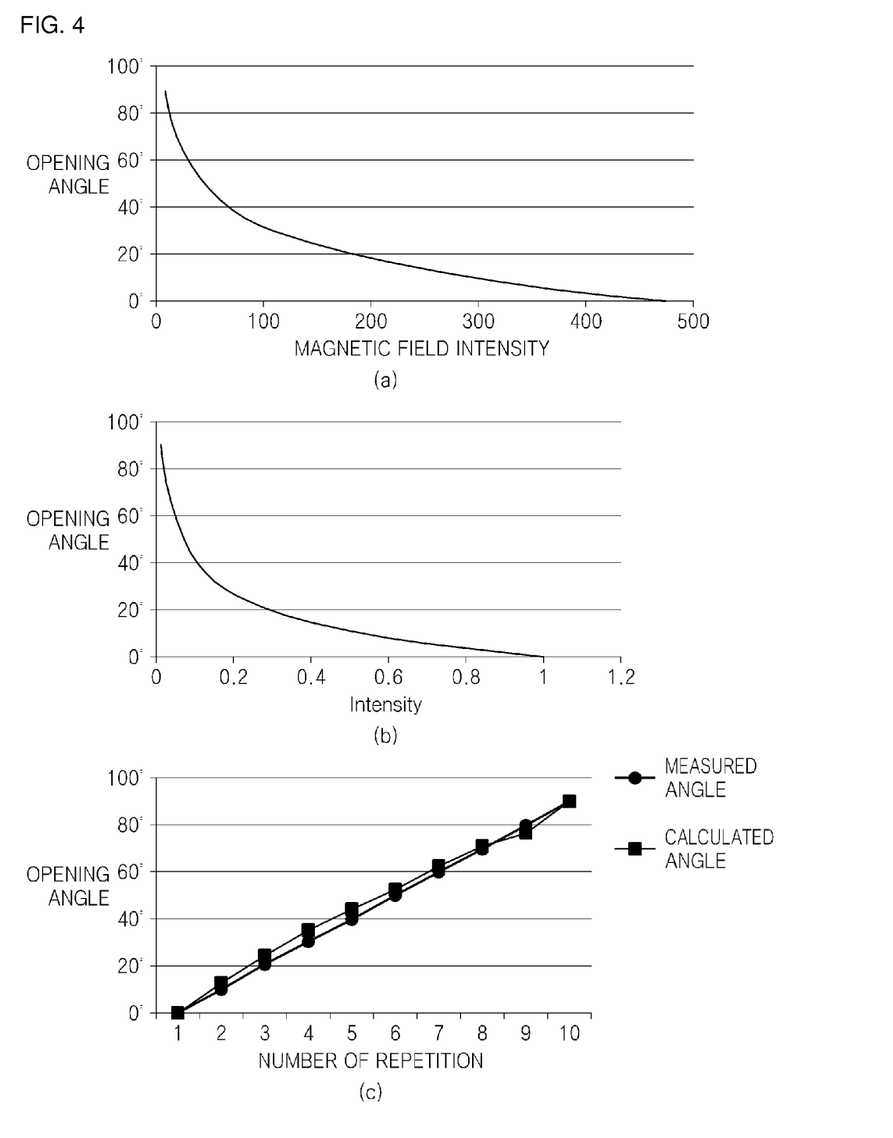
FIG. 4 is a diagram illustrating an example of a relation between an opening angle of a flip cover and a magnetic field intensity.

FIG. 4 is a graph illustrating an example of the relationship between an opening angle of the flip cover and a magnetic field intensity.

Referring to FIGS. 4a and 4b, the opening angle of the flip cover 200 is inversely proportional with the magnetic field intensity sensed by the at least one Hall element 111. As the angle of the flip cover 200 decreases, the magnetic field intensity being sensed through the at least one Hall element 111 is exponentially increased.

In one example, the magnetic field intensity may be converted to separated factors for effective calculation of the opening angle of the flip cover 200 and may be used to indicate a magnetic field average factor and an angle weight factor.

The magnetic field average factor may correspond to a matched value which matches a degree of the magnetic field intensity variation according to an opening angle variation (e.g., from 0 degree to 90 degree) with a certain range value (e.g., from a value of 99 to a value of 1). When a polarity of the Hall elements 111 exist, the magnetic field average factor may be calculated based on an arithmetic mean value of the magnetic field intensity being collected from each of the polarities of the Hall elements 111. The magnetic field average is proportional with the magnetic field intensity.

The angle weight factor is based on 0 degrees of the opening angle and corresponds to a weight being applied to an angle calculation according to the magnetic field intensity. The angle weight factor may be calculated according to Mathematical Equation 1 and is inversely proportional with a degree away between the flip cover 200 and the Hall sensor 110. That is, as the angle of the flip cover 200 increases, the angle weight is decreased.

Intentsity_$N$=an average of magnetic field at $N$ degrees/an average of magnetic field at 0 degrees [Mathematical Equation 1]

Herein, Intensity_$N$: an angle weight at $N$ degrees

For example, the magnetic field average factor and the angle weight factor may be changed as follows in Table 1 according to the opening angle of the flip cover 200.

TABLE 1

| Opening angle | The average of the magnetic field | The angle weight |
|---|---|---|
| 0 | 99 | 1 |
| 10 | 54 | 0.545455 |
| 20 | 29 | 0.292929 |
| 30 | 17 | 0.171717 |
| 40 | 11 | 0.111111 |
| 50 | 7 | 0.070707 |

TABLE 1-continued

| Opening angle | The average of the magnetic field | The angle weight |
|---|---|---|
| 60 | 5 | 0.050505 |
| 70 | 3 | 0.030303 |
| 80 | 2 | 0.020202 |
| 90 | 1 | 0.010101 |

In Table 1, the angle weight corresponds to a calculated value converting 0 degrees into 1. For example, when the opening angle is 40 degrees, the average of the magnetic field is calculated to be 11. Accordingly, in this case, the angle weight is calculated to be 11/99=0.11 according to Mathematical Equation 1.

The angle determination unit 112 may obtain the angle of the flip cover 200 by using a logarithmic function and a base of the logarithmic function may be calculated based on the angle weight. The angle determination unit 112 may determine the opening angle of the flip cover 200 according to the magnetic field intensity being collected from the at least one Hall element 111 by using Mathematical Equation 2 below.

$Y=\log a(\text{Intensity\_}N)$ $a=\text{Exp}[\{\text{Ln}(\text{intensity\_}90)\}/90]$ [Mathematical Equation 2]

$N$: an opening angle
$Y$: an angle of the flip cover
Intensity_$N$: an angle weight at $N$ degrees
Intensity_90: an angle weight at 90 degrees
$a$: a base of a logarithmic function
Exp: an exponential function
Ln: a natural logarithmic function In Mathematical Equation 2, the angle Y of the flip cover 200 corresponds to an opening degree of the flip cover 200 and indicates a range from 1 to 90 degrees. The angle Y of the flip cover 200 corresponds to 0 degrees when X=Intensity_0 and the angle Y corresponds to 90 degrees when X=Intensity_90. Also, the angle Y ranges from 0 degrees to 90 degrees when X indicates a range from 0 to Intensity_90.

'a' corresponds to the base of the logarithmic function and is calculated according to Mathematical Equation 3 below.

$90=\log a(\text{Intensity\_}90)$ $90=\text{Ln}\{\text{Intensity\_}90\}/\text{Ln}(a)$ $\text{Ln}(a)=(\ln(\text{Intensity\_}90))/90$ $a=\text{Exp}[\{\text{Ln}(\text{Intensity\_}90)\}/90]$ [Mathematical Equation 3]

Herein, the base of the logarithmic function, 'a', is calculated based on a log (X)/90 where X is the smallest value of the magnetic field intensity (i.e., the smallest value of the angle weight). The angle weight corresponds to the smallest value when the angle is 90 degrees. When the base of the logarithmic function, 'a', is determined, the opening angle is easily calculated according to Mathematical Equation 2. The base of the logarithmic function, 'a', is less than 1.

Referring to FIG. 4c, repetitive tests may verify that the measured angle of the flip cover 200 is approximately the same as the angle calculated by Mathematical Equation 1 through gradually increasing the opening angle of the flip cover 200.

Figure 5:
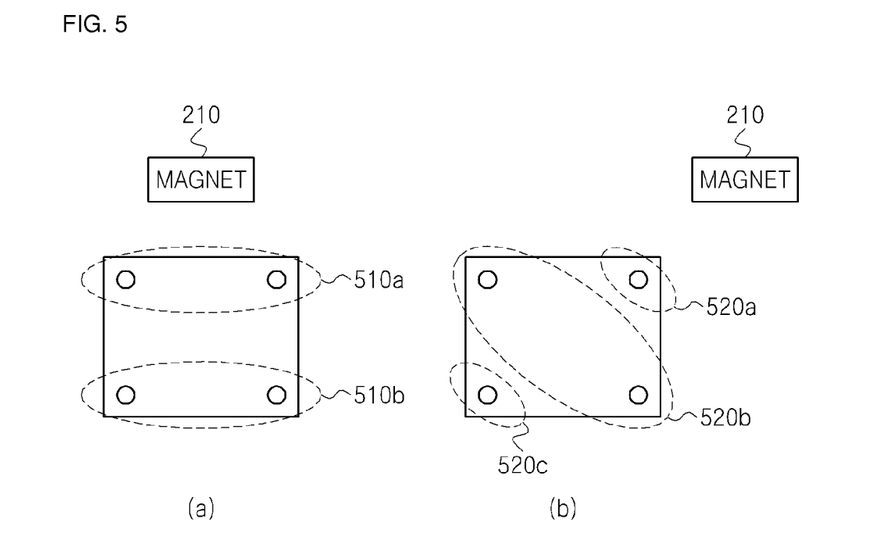
FIG. 5 is a diagram illustrating an example of a method of determining an angle according to determination of a Hall element cluster.

FIG. 5 is a diagram illustrating an example of a method of determining an angle according to determination of a Hall element cluster.

The at least one Hall element 111 may be at least one Hall cluster according to a distance from the magnet 210.

In FIG. 5a, when the magnet 210 is arranged in close distance with the upper side of the Hall sensor 110, the at least one Hall element 111 may be first and second Hall elements 510a and 510b according to the distance from the magnet 210. The angle determination unit 112 may be calculated based on the arithmetic mean value of the magnetic field strength of each of the first and second element clusters 510a and 510b.

In FIG. 5b, when the magnet 210 is arranged in one of the corners of the Hall sensor 110, the at least one Hall element 111 may be first, second and third Hall elements 520a, 520b and 520c according to the distance from the magnet 210. The angle determination unit 112 may be calculated based on the arithmetic mean value of the magnetic field strength of each of the first, second and third element clusters 520a, 520b and 520c.

Figure 6:
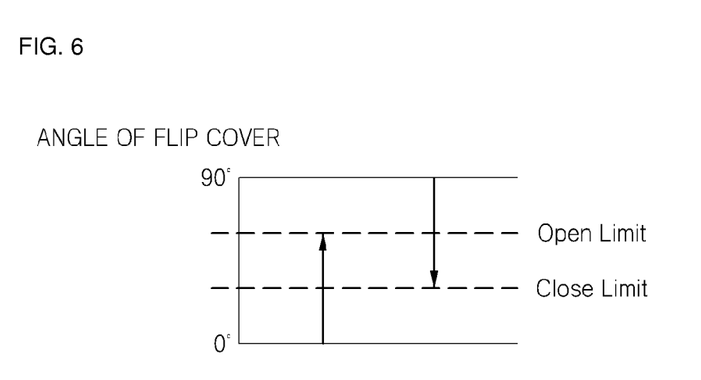
FIG. 6 is a diagram illustrating an example of a determination of opening or closing threshold according to sensing of a flip cover.

FIG. 6 is a diagram illustrating an example of a determination of the opening or closing threshold according to the sensing of the flip cover.

Referring to FIG. 6, the threshold determination unit 113 may respectively determine the opening and closing thresholds based on the angle of the flip cover 200. When the angle of the flip cover 200 satisfies the Open limit according to gradually increasing the angle of the flip cover 200 from 0 degrees, the mobile terminal (or display terminal) 100 is operated to On from Off. On the other hand, when the angle of the flip cover 200 satisfies the Close limit according to gradually decreasing the angle of the flip cover 200 from opening (i.e., the angle is more than 90 degree), the mobile terminal (or display terminal) 100 is operated to Off from On. Therefore, the mobile terminal (or display terminal) 100 may stay Off when the flip cover 200 implements a malfunction instantaneously exceeding the threshold.

The threshold determination unit 113 may determine a certain angle being determined by the angle determination unit 112 as the opening or closing threshold.

In one example, the threshold determination unit 113 may determine the opening or closing threshold of the flip cover 200 based on opening and closing data related with the distance from the magnet 210. In this example, the opening and closing data related with the distance from the magnet 210 may include a ratio between the at least one Hall element clusters 510 and 520.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of sensing a flip cover coupled to an electronic device having a processor, comprising:
    collecting, with the processor, a magnetic field intensity generated between a magnet of the flip cover and a Hall sensor in the electronic device, the Hall sensor being configured to be covered by the flip cover; and
    determining, with the processor, an opening angle of the flip cover, wherein the electronic device is responsive to the angle of the flip cover,
    wherein the determining the opening angle of the flip cover further comprises:
        calculating an arithmetic mean value of the magnetic field intensity being collected;
        calculating an angle weight based on the arithmetic mean value; and
        determining the opening angle based on the calculated angle weight, and
    wherein the opening angle is obtained by using a logarithmic function, and
    wherein the opening angle is determined by the following:

$Y = \log a(\text{Intensity } N)$ $a = \text{Exp}[\{\text{Ln}(\text{Intensity } 90)\}/90]$, wherein Y denotes an opening angle of the flip cover;
    Intensity N denotes an angle weight at an N degree;
    a denotes a base of the logarithmic function;
    Exp denotes an exponential function; and
    Ln denotes a natural logarithmic function.

2. The method of sensing the flip cover of claim 1, wherein
    the Hall sensor comprises at least one Hall element;
    the magnetic field intensity is collected using the at least one hall element; and
    the opening angle of the flip cover based on the collected magnetic field intensity.

3. The method of sensing the flip cover of claim 2, wherein the collecting a magnetic field intensity further comprises collecting a magnetic field direction of the magnet from the at least one Hall element.

4. The method of sensing the flip cover of claim 1, wherein the opening angle is calculated based on an arithmetic mean value of the magnetic field intensity being collected.

5. The method of sensing the flip cover of claim 1, wherein the angle weight decreases from a largest magnetic field intensity in response to the opening angle of the flip cover increasing.

6. The method of sensing the flip cover of claim 1, wherein a base of the logarithmic function is calculated based on the angle weight.

7. The method of sensing the flip cover of claim 6, wherein the base of the logarithmic function is calculated based on log (X)/90 and X is a smallest angle weight.

8. The method of sensing the flip cover of claim 1, wherein the opening angle is calculated based on an arithmetic mean value of magnetic field intensities for each of first and second Hall element clusters being classified according to a distance from the magnet.

9. The method of sensing the flip cover of claim 1, wherein the opening angle is calculated based on an arithmetic mean value of magnetic field intensities for each of first, second, and third Hall element clusters being classified according to a distance from the magnet.

10. The method of sensing the flip cover of claim 1, wherein the opening and closing thresholds are determined based on opening and closing data related with a distance from the magnet.

11. The method of sensing the flip cover of claim 1, wherein the electronic device is configured to stay off in response to the determined opening angle of the flip cover.

12. The method of sensing the flip cover of claim 1, wherein the Hall sensor comprises a plurality of Hall elements, and
    wherein the plurality of Hall elements are respectively arranged in each corner of the Hall sensor, and each of the Hall elements senses a different magnetic field intensity based on its distance from the magnet of the flip cover, and
    wherein an arithmetic mean value of the different magnetic field intensities is used for determining the opening angle of the flip cover.

13. A Hall sensor included in a terminal coupled to a processor, the Hall sensor comprising:
    at least one Hall element; and
    an angle determination unit configured by the processor to determine an opening angle of a flip cover covering the terminal, the opening angle being calculated based on a magnetic field generated between a magnet of the flip cover and the Hall element, wherein the opening angle is determined by the following:

$Y = \log a(\text{Intensity } N)$, $a = \text{Exp} [\{\text{Ln}(\text{Intensity } 90)\}/90]$, wherein Y denotes an opening angle of the flip cover, Intensity N denotes an angle weight at an N degree, the angle weight is calculated based on an arithmetic mean value of the magnetic field intensity, a denotes a base of the logarithmic function, Exp denotes an exponential function, and Ln denotes a natural logarithmic function.

14. The Hall sensor of claim 13, wherein the at least one Hall element is configured to collect a magnetic field intensity which is generated from the magnet; and the angle determination unit is configured to determine the angle of the flip cover based on the collected magnetic field intensity.

15. The Hall sensor of claim 13, wherein the opening angle is calculated based on the arithmetic mean value of magnetic field intensities for each of first and second Hall element clusters.

16. A terminal, having a processor, configured to be covered by a flip cover, the terminal comprising:

a Hall sensor, comprising at least one Hall element, the Hall sensor being configured by the processor to determine an opening angle of the flip cover responsive to a magnetic field generated between a magnet of the flip cover and the at least one Hall element, wherein the opening angle is determined by the following:

$Y = \log a(\text{Intensity } N)$, $a = \text{Exp} [\{\text{Ln}(\text{Intensity } 90)1\}/90]$, wherein Y denotes an opening angle of the flip cover, Intensity N denotes an angle weight at an N degree, the angle weight is calculated based on an arithmetic mean value of the magnetic field intensity, a denotes a base of the logarithmic function, Exp denotes an exponential function, and Ln denotes a natural logarithmic function.

17. The terminal of claim 16, wherein the at least one Hall element is configured to collect a magnetic field intensity which is generated from the magnet; and the Hall sensor is configured to determine the opening angle of the flip cover based on the collected magnetic field intensity.

18. The terminal of claim 16, wherein the opening angle is calculated based on the arithmetic mean value of magnetic field intensities for each of the first, the second, and the third clusters.

* * * * *